UNITED STATES PATENT OFFICE.

EDWARD HACKING, OF CENTRAL FALLS, RHODE ISLAND.

ELECTROLYTE FOR ELECTRIC STORAGE BATTERIES.

1,362,295.   Specification of Letters Patent.   Patented Dec. 14, 1920.

No Drawing. Original application filed December 17, 1919, Serial No. 345,461. Divided and this application filed June 8, 1920. Serial No. 387,491.

*To all whom it may concern:*

Be it known that I, EDWARD HACKING, a citizen of the United States, residing at Central Falls, in the county of Providence and State of Rhode Island, have invented certain new and useful Improvements in Electrolytes for Electric Storage Batteries, of which the following is a specification.

My invention relates particularly to an electrolyte for secondary or storage batteries of the standard type in which lead plates and sulfuric acid are employed. This application constitutes a division of my pending United States patent application Ser. No. 345,461 filed December 17, 1919.

The essential objects of my invention are to prevent the shedding of the active material of the plates; to facilitate the circulation of the acid; to insure solidity and to maintain the plates firmly and rigidly; to eliminate washing from the plates the valuable oxid deposits thereon; to insure close adhesion of the electrolyte to the plates; and to provide an electrolyte capable of being introduced into the cell as a liquid and thereupon assume a solid condition without physical assistance, and to produce an electrolyte of a solid character which notwithstanding its solid character furnishes a gravity reading.

My invention consists in such compositions of matter as form the subject of the appended claims.

The preferred method of carrying out my invention is as follows.

I prepare a solution formed by mixing water and silicate of soda in the proportion of four ounces of water to two ounces of silicate of soda.

I prepare independently of the above a second solution. This consists in dissolving borax in sulfuric acid of preferably approximately 1400 degrees of Baumé. The proportion of ingredients is thirty two ounces of water to three ounces of borax.

Next a mixture of the following ingredients is made, namely, sixteen ounces of powdered pumice, four ounces of the first solution, and two ounces of the second solution.

This constitutes a thick creamy mixture which, in the required quantity is poured into the battery cell until it covers the plates. The quantity is obviously determined by the capacity of the particular cell. After about an hour after its introduction into the cell the material sets into a solid porous mass or electrolyte. The consistency of this material is such as to prevent shedding of the plates.

In use at any time it is possible to introduce a small quantity of water into the battery upon the top of the electrolyte and then get a gravity reading of the strength of the charge in the battery.

I claim:

1. An electrolyte for electric storage batteries which consists of a mass of pumice combined with sulfuric acid.

2. An electrolyte for electric storage batteries consisting of a hardened mass of pumice and borax.

3. An electrolyte for electric storage batteries comprising a hardened mass of pumice, borax and sulfuric acid.

In testimony whereof I have affixed my signature.

EDWARD HACKING.